United States Patent [19]
Walklet

[11] 3,755,829
[45] Sept. 4, 1973

[54] TURBULENCE SUPPRESSION APPARATUS FOR A BODY OF WATER

[75] Inventor: Mercer Donald Walklet, Medina, Ohio

[73] Assignee: Adolph Kiefer McNeil Corporation, Akron, Ohio

[22] Filed: Mar. 28, 1972

[21] Appl. No.: 238,798

[52] U.S. Cl............................................ 4/172, 9/8
[51] Int. Cl............................ E04h 3/16, E04h 3/18
[58] Field of Search .................... 4/172, 172.15; 9/8

[56] References Cited
UNITED STATES PATENTS

| | | | |
|---|---|---|---|
| 3,304,560 | 2/1967 | Kiefer | 4/172.15 |
| 2,117,982 | 5/1938 | Prince, Jr. | 4/172.15 |
| 3,050,750 | 8/1962 | Harrison | 9/8 |
| 3,074,083 | 1/1963 | Schirmer | 9/8 |
| 3,116,925 | 1/1964 | Welch | 9/8 |
| 3,540,063 | 11/1970 | Stanwood | 4/172 |

Primary Examiner—Henry K. Artis
Attorney—Eugene Sabol et al.

[57] ABSTRACT

A multiplicity of perforated disc-shaped elements are maintained in axially aligned, axially spaced relationship by means of a taut cable to define a barrier which substantially eliminates transmission of water turbulence from one side to the other of the barrier. The elements are individually revoluble about horizontal axes supported approximately at mean water level to absorb, aerate, and dissipate the kinetic energy of wave action.

17 Claims, 7 Drawing Figures

PATENTED SEP 4 1973

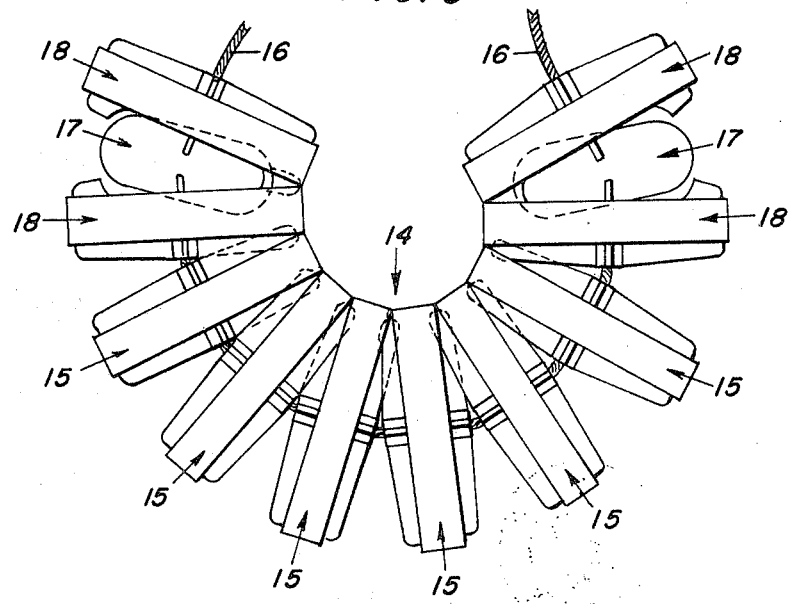
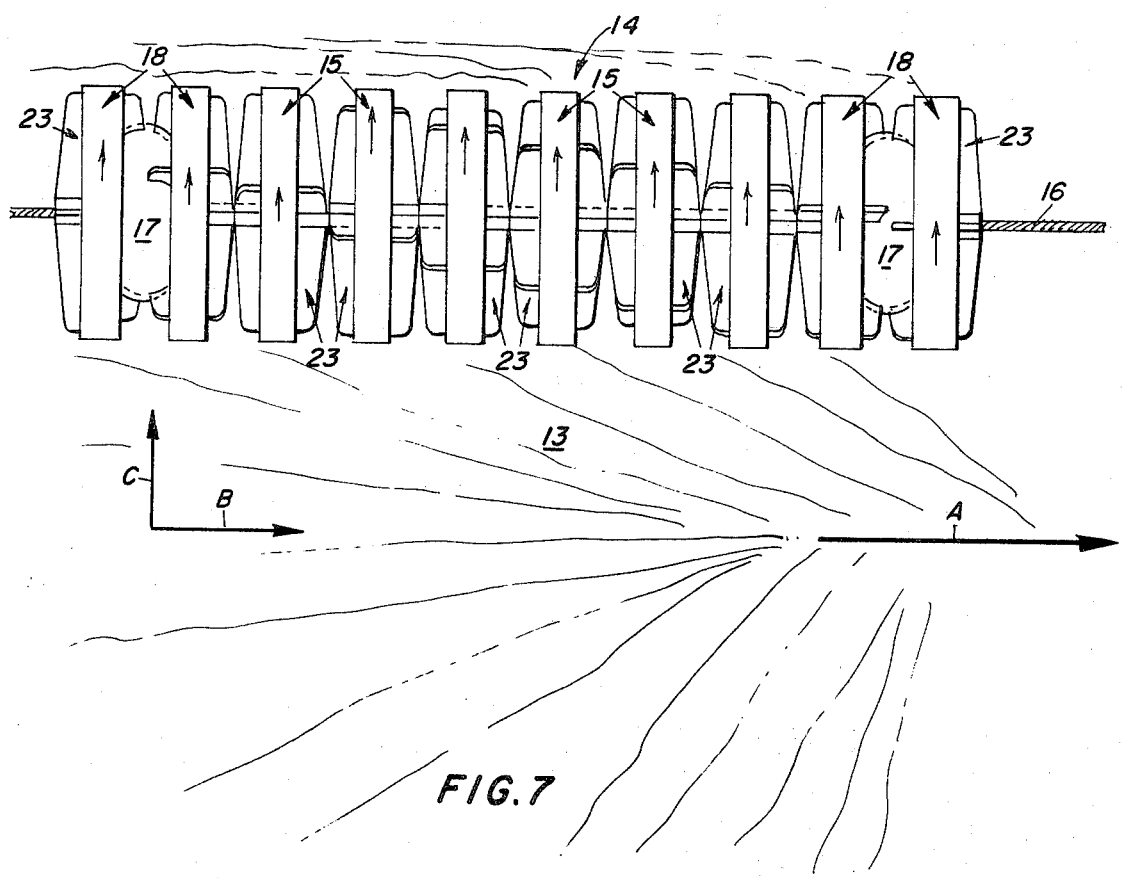

TURBULENCE SUPPRESSION APPARATUS FOR A BODY OF WATER

This invention relates to aquatic devices and, more particularly to systems for defining racing lanes and reducing turbulence in swimming pools and other bodies of water.

A device of this type has been described and claimed in U.S. Pat. No. 3,304,560, granted to Adolph G. Kiefer on Feb. 21, 1967, and assigned to the assignee of the present application.

Said Kiefer patent utilized a series of hollow cylindrical elongated bodies having perforated surfaces defined by a series of integrally molded plastic strips which criss-crossed each other in what may be called a lattice-work fashion. These bodies are confined in axial alignment by means of a line, or cable, attached at opposite ends of a swimming pool and maintained under tension for the purpose of holding the individual bodies substantially one-half submerged. In addition, since the assembly of lattice-like bodies and cable has a slightly negative buoyancy, floats are attached to the cable (or to the bodies) to assist in maintaining the bodies one-half submerged.

The assembly of bodies just described can be briefly stated as being effective to substantially eliminate the passage of disturbed water, caused by the efforts of a high-speed swimmer proceeding in one racing lane, from being transmitted to the next adjacent lane. This results from the fact that the turbulence of the wake produced by the moving swimmer is absorbed, or dampened, when it reaches the turbulence reducing bodies by the fact that the waves and troughs forming the wake are broken up and water is aerated reducing driving force of waves by the perforated surfaces and portions of the kinetic energy in the wake is absorbed by efforts expended in rotating the turbulence reducing bodies which are freely rotatable about the restraining cable.

Another device of this type, which operates substantially in accordance with the principles originally disclosed in the aforementioned Kiefer patent, is disclosed in U.S. Pat. No. 3,540,063 granted to David A. Stanwood on Nov. 17, 1970.

In the present invention, the wave suppression assembly comprises a continuous series of open-faced perforated discs, resembling spoked wheels, strung together in axially aligned and axially spaced relationship on a taut line, or cable, so that each of the elements is independently freely rotatable about its central axis.

One advantage of the present invention is, therefore, that it is more restrictive to irregular wake patterns, or eddy currents, than the prior devices of the Kiefer type in which each of the freely revoluble elements comprised an elongated body. Thus, in the prior art, any force acting, for example on one side of an elongated turbulence reducing body and sufficient to effect movement of the body, created a slight counter turbulence back into the area from which the force acting was generated.

In addition, the shorter length and larger diameter of the disc-shaped bodies embodying the present invention, having greatly reduced mass, effectively reduces the inertia of each body and makes possible a more localized control of small disturbances in the water.

Further, the comparatively short axial length of each of the turbulence reducing bodies of the present invention, means that, as a practical matter, there are no limitations on the dimensions of the racing lanes which can be protected, whereas in the prior art, in which each element was approximately a foot, or so, in length, a gap in the lane always existed at every multiple of the element. If the length of the pool is not an exact multiple of the length of the element, there would also be an unfilled gap in the lane. In the present, the axial length of each element is preferably no more than an inch or two, and elements can be added, or subtracted, at will so that a continuous barrier along the sides of a lane can always be obtained regardless of the length of the lane in use.

Still another advantage of the present invention is the fact that when not in use, the entire assembly can be coiled up into a relatively small space for storage, or transport.

Other objects and advantages will be apparent to those skilled in the art after reading the following specification in connection with the attached drawings, in which:

FIG. 6 is a side elevation of a series of turbulence suppressors, with a float, all attached to a restraining cable, but coiled in semi-telescoped relationship for storage, or transportation, and;

FIG. 7 is a diagrammatic plan view representing the various force relationships created by the movements of a swimmer.

Figure 1:
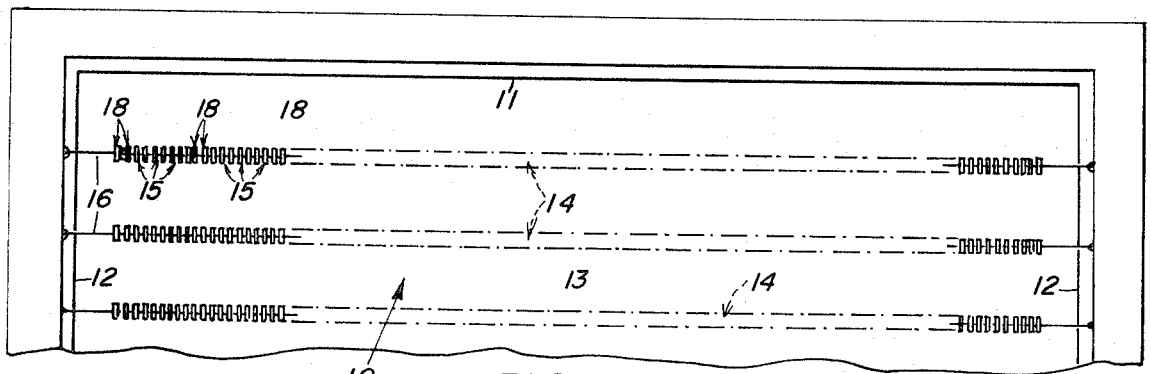
FIG. 1 is a plan view of a portion of a body of water, such as a swimming pool, showing a preferred form of turbulence reducing devices according to the invention, arranged to define several parallel racing lanes for swimmers.

In the drawings, one side of a typical swimming pool 10, is shown in FIG. 1, having side walls 11 and end walls 12 to confine a body of water 13. Extending between the end walls are a series of wave aeration suppression, or turbulence reducing devices, indicated generally by numeral 14, which define a plurality of parallel lanes in the water each of which is for the use of an individual swimmer taking part in competitive swimming events. Each of the turbulence suppressing assemblies 14 is preferably composed of a series of spoked discs, or perforated plate-shaped devices, indicated generally by numeral 15, which are held in alignment by restraining means, such as a rope, or cable, 16 attached to the opposite end walls 12, of the pool. Preferably, the cable is maintained in a taut condition by a suitable tensioning device, such as a turnbuckle, winding reel, or other conventional means (not shown) and is positioned substantially at the water line so that the elements 15 will lie approximately half-submerged, for reasons which will be apparent later.

For practical reasons, the most common form of restraining means includes a braided, or twisted, steel wire cable having a plastic coating, such as that sold under the trademark Wirelon, but non-metallic ropes would not be ruled out provided they have sufficient resistance to elongation under tension to keep the elements 15 in substantial alignment. However, when wire rope, or other metallic cables are used, which have a specific gravity much higher than water, it is desirable to include float means to assist in holding the cable substantially at water level along its entire length. Of course, one method of accomplishing this would be to manufacture the bodies 15 from a lightweight material, such as a cellular synthetic plastic material.

Again, however, due to the state of the art and the exigencies of conventional manufacturing practices, it has been found that cellular plastic materials either are too fragile for continuous everyday use or, are too expensive to mass produce. Therefore, in practice, it has been found desirable to mold the elements 15 from unfoamed plastics, such as polyvinyl chloride or the like which, when completed, have a specific gravity only slightly less than water and to include means such as the floats indicated generally by numeral 17 deployed at intervals along the length of the wave suppression assembly 14, the effect of which is to povide the assembly as a whole with what may be considered a substantially uniformly distributed effective specific gravity changed to positively less than that of water, which in effect, elevates the entire length of the lane to being half submerged.

Furthermore, in order to accommodate the various floats 17 without substantially altering the uniformity of the wave damping pattern presented by the series of bodies 15, a pair of modified forms of wave damping body, indicated generally by numeral 18, are preferably positioned on either side of each of the evenly spaced floats in the lane.

Figure 2:
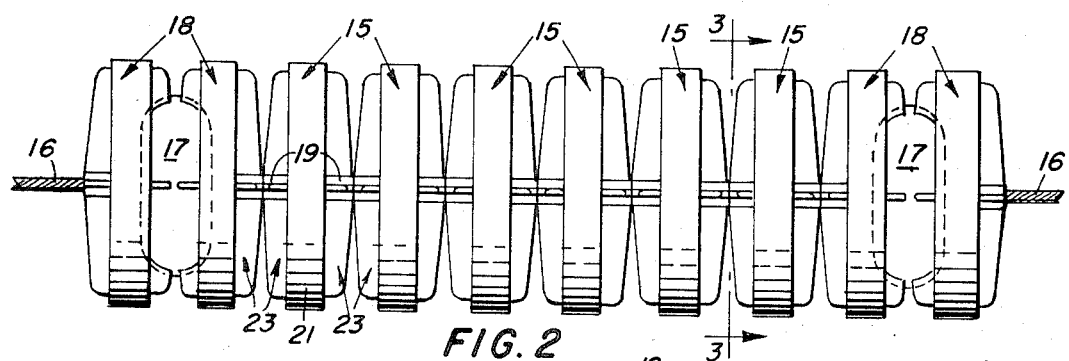
FIG. 2 is a view in elevation of a section of one of the racing lane markers shown in FIG. 1, on an enlarged scale.
Figure 3:
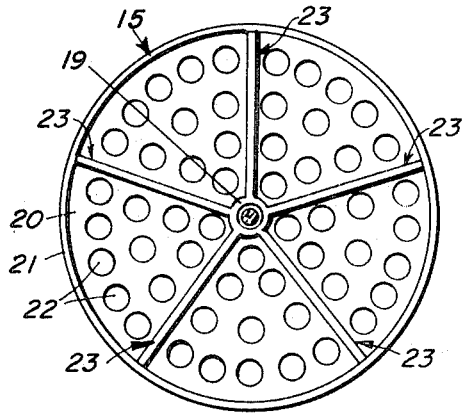
FIG. 3 is an end elevation of one form of rotary body employed in the combination shown in FIG. 2.

Turning now to FIGS. 2 and 3, where the individual damping bodies 15 are shown in more detail, it will be seen that they comprise a supporting portion, which may consist of a hollow hub portion 19, having a central bore through which the cable 16 may pass freely. Approximately midway of the length of the hub, there is a radially extending web, or spider 20, which supports an annular ring shaped cylindrical baffle member 21 in concentric relationship to the restraining means 16. Further, to assist in damping the longitudinal component of wave forces, the web member 20 may be provided with a multiplicity of openings 22, and while these are shown as being circular, the exact configuration is not important so long as the web portion 20 serves to impede, aerate, or dampen and break up waves moving diagonally from one side of the assembly of elements 15 to the other side. In fact, the element 20 could also comprise a series of radially extending flat, or fanshaped, spokes which would accomplish the same purpose.

In order to assist the effect of the annular ring 21 in dissipating the lateral component of force of a wave, the disc-shaped elements 15 may also be provided with a series of axially extending baffle surfaces which in a preferred form comprise a series of equi-angularly arranged vanes, or blades, indicated generally by numeral 23, radiating outwardly from the hub 19. While there are five of these blades shown in the drawings, it is considered that this number is not critical, although with less than three it is considered that the effectiveness of the device would be reduced. Each of the blades has an axial margin 24 which at the root of the blade may start at the extremity of the hub and taper progressively axially inwardly as it approaches the extremity in order not to interfere with the individual free rotation of the elements 15, which otherwise would result from interference between the blades of adjacent rotary elements. The axial margins merge at their extremities with the peripheral margin 25 which terminates at a location just inside the inner surface of the ring shaped portion 21, for a reason which will be apparant later.

Figure 4:
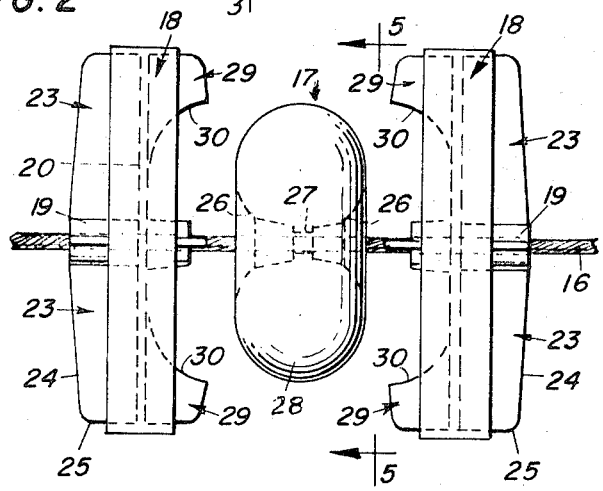
FIG. 4 is a side elevation of a float means employed in the arrangements of FIGS. 1 and 2, together with a pair of modified rotary bodies adjacent the float means.
Figure 5:
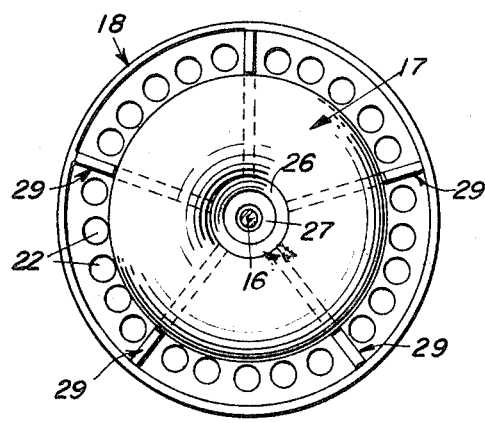
FIG. 5 is an end elevation of the float means and adjacent rotary body as viewed from the plane of line 5—5 of FIG. 4.

As stated above, at appropriate intervals the floats 17 are strung on the restraining cable 16. While various types of floats can be used, such as a foamed plastic block, in FIGS. 4 and 5, it can be seen that the preferred form comprises a hollow toroidally-shaped body 28, having a central web 26 provided with a concentric opening 27 to position the float for freely sliding movement on the cable 16. The overall diameter of the float is preferably such that it may be between a pair of wave suppression discs 18, which are similar to the discs 15 in that they include a hub 19, perforated web 20, annular ring 21 and a set of vanes 23 on one side of their respective webs. They differ, however, in that the vanes 29 formed on the respective sides of the webs are cut out, as at 30, along a circular arc corresponding to the shape of the toroidal body 28 of the float. Thus, the float can be accommodated between the discs 18 in a manner which makes it possible to maintain a generally uniform spacing between the annular baffle rings 21 and the transverse baffles 20 along the entire length of the assembly 14 regardless of how many floats are used to maintain uniform buoyancy and regardless of the location of the floats. This is an advantage not possessed by the earlier forms of turbulence reducing devices.

FIG. 6 illustrates the unique flexibility of the present invention which permits the assembly 14 to be coiled into a relatively compact form for storage and transportation without the necessity for disassembly of the several elements from each other, or the restraining cable. The fact that the end margins 25 of the blades 23 terminate radially inwardly of the rings 21 and the ability of each disc to rotate freely on the cable makes it possible for the blades of one disc to move into the space behind the ring of an adjacent disc in telescopic relationship to the angularly offset blade of the adjacent disc; the blade of the adjacent disc moving into the space behind the ring of the first disc, as indicated by dotted lines in FIG. 6. The same is also true of the modified blades 29 adjacent the floats, since the cut-out portions 30 allow the blades to rotate around the exterior of the toroidal body 28.

FIG. 7 is an attempt to illustrate the effects of wave action caused by the movement of an object, such as a swimmer, moving in the direction parallel to an assembly 14 of turbulence reducing devices, as indicated by arrow A. This movement leaves a disturbance, or wake, in its path which moves out normally in two diagonal directions, one on each side.

As is well known, the wake usually develops as a series of generally parallel crests and troughs in the water and as shown, the crests of water on the side of the wake moving toward the assembly 14 have a component of force, indicated by arrow B, acting longitudinally and parallel to the assembly 14 and in the direction of movement of the swimmer. There is also another component of force, indicated by arrow C, which acts in a direction transverse to the length of assembly 14 and away from the path of the moving object.

Obviously, the relative strengths of these components are not necessarily proportional to the lengths of the arrows B and C, but it will be obvious that when the wake does reach the wave suppression assembly 14, the longitudinal component of force B tends to cause a movement of water in a direction normal to the surfaces of the spiders, or webs, 20 of each of the respective discs 15 and 18. If these webs were solid, the result would be to reverse the direction of the water movement and set up a new series of reflected water turbulence but, since the webs are perforated, the net result is that the water impelled against them is aerated and broken up and only partially reversed so that the movement caused by the component B is substantially nullified. Any reversed movement is confined and broken up by moving back into the adjacent web.

The dissipation of the lateral component of force C is slightly more complex. First, it must be remembered that the efficacy of each of the bodies 15 (as well as the modified forms 18) is based on the assumption that each of these bodies is to be maintained for individual free rotation about its own concentric axis with this axis being also maintained substantially at the mean water line so that the body will be only half submerged so long as the water is undisturbed. In practice, however, there will be a continual slight shifting of the relative submergence of each suppressor body depending on whether it lies in the path of the crest of a wave, or in the trough between crests.

Assuming a tranquil water condition when the suppressors are lying one-half submerged, if a wave appears, it will tend to cause relative submergence of the rotatable body. The wave, moving in the direction C as in FIG. 7, will simultaneously come in contact with the outer annular baffle 21 of the suppressor 18 at the left end of the line and the space between each suppressor, as it continues to move in the normal diagonal direction, it will contact the outer ring of each succeeding suppressor 18, or 15, in the direction from left to right until it finally reaches the suppressors 18 at the right hand end of each floated section. In addition, 50% of the wave will initially pass unobstructed between the spaces separating the annular rings of each suppressor. These segments immediately thereafter come in contact with the blade, or blades, 23 which at that time are projecting upwardly above the mean water level, with a force which tends to cause rotation of the body about its restrained, but freely rotatable, center axis. However, this rotation is resisted by the blade, or blades, which at that time are partially submerged. Still lesser amounts of water from the wave may even pass between the spaces between the upper extremities of adjacent blades on deflected angles so to come into contact with inside of 18 on opposite side of lane from which wave approaches further suppressing wave.

Following the water which first contacts the exposed blades, there will be a certain amount of water which, having come up against the annular ring, will be diverted by the ring into the open spaces on each side thereof. Much of the energy of this diverted water will have then been spent but, as it continues into and beyond the intervening spaces, it will contact the vanes on the sides of the body which will have become exposed due to rotation produced by the water which has preceded it. Thus, the net effect of the lateral component of force is merely to churn up and aerate the water only along the length of the assembly, which dissipates and absorbs the energy of the wave and prevents its propagation further on the opposite side of the assembly.

Between each wave there is a trough whose lowermost level is below the mean level of the body of water as a whole, which means that when it reaches one of the bodies 15, or 18, the effective submergence of that body is reduced; that is to say, it becomes somewhat less than half-submerged due to the lowering of the water level and the restraint of cable 16.

Another result is that because the trough is following the back side of a wave, the longitudinal and transverse components of force B and C become reversed because the water in each wave tends to move, in the long run, to fill up the space left by the troughs on each side.

The longitudinal component of force resulting from a crest is dissipated by contact with the perforated webs 20 in the same manner as the longitudinal component B caused by a wave, but the respective components of the waves and troughs will also tend to cancel each other out; the webs acting to deter longitudinal shifting of water, due to the fact that the respective components do not act simultaneously but in alternate succession.

Since the water forming each wave tends to flow into the adjacent troughs, once the crest of a wave has passed the center line of each of the disc-shaped bodies, the movement of the water becomes lessened and, since the suppressor body begins to rise relative to the water level, this reduced force acts only on the blades, or vanes 23 or 29, lying below the mean water level at that instant.

The combination of this reverse movement (downward, as viewed in FIG. 7) on the lower vanes together with the forward movement (upward, as viewed in FIG. 7) on the upper vanes already produced by the receding previous wave is additive; the two forces both tend to induce clockwise rotation of a suppressor disc (as viewed from the right in FIG. 7). Thus, when the bottom of the trough is passing under a suppressor, there is less resistance to this rotation and water trapped in the space within the confines of the annular ring baffle 21 will be dumped out by the revolving vanes to fill in where the trough would normally exist, namely on the far side of the suppressor. Of course, when the next wave approaches, more and more water reaches the lower vanes as the suppressor begins to re-submerge relative to the actual water level. In terms of the lateral component of force C on each suppressor, its value is substantially nil at mean water level; it increases to maximum in the positive sense up to the approach of the crest of a wave; as the crest recedes, it reduces in value to zero at the lowest level of water, and begins to increase on the approach of the next wave.

The above explanation is vastly simplified, and it should be understood that the precise force relationships and movements are too complex to be set forth except in such generalities. It should also be remembered that wave action does not cause bodily displacement of water in a lateral direction, although the surface water does shift in successive oscillatory motions of contraction (to gather into each wave) and retraction (to expose a resultant trough).

The claims are:

1. A turbulence reducing device for use in a body of water comprising a plurality of disc-shaped elements, each having a central opening to receive an elongated restraining means to position said disc-shaped elements in free-rotating axial alignment, each of said discs comprising a plurality of blades extending outwardly from said opening and having surfaces extending generally in planes parallel with the central axis, and float means for the restraining means positioned between certain pairs of said disc-shaped elements.

2. The invention defined in claim 1, wherein each of said disc-shaped elements includes at least three equiangularly spaced blades.

3. The invention defined in claim 2, wherein said float means is generally of smaller diameter than said disc-shaped elements and portions of the blades of said certain pairs of elements are cut away to accommodate the presence of a float means.

4. The invention defined in claim 1, wherein each of said disc-shaped elements includes radially extending spider means to dampen longitudinal movement of water.

5. The invention defined in claim 4, wherein each of said disc-shaped elements also includes an annular ring-shaped concentrically disposed surface.

6. The invention defined in claim 5, wherein said spider means is positioned centrally of the width of said ring-shaped surface, and said blades include means to position the adjacent disc-shaped elements on said supporting means to provide an annular space between adjacent ring-shaped surfaces.

7. The invention defined in claim 6, wherein said means to position the disc-shaped elements includes a hub portion surrounding said central opening and having an axial length greater than the width of said ring-shaped portion.

8. The invention defined in claim 7, wherein at least a portion of the surface of each of said blades extends axially beyond the transverse planes defined by the respective margins of the ring-shaped surface.

9. The invention defined in claim 8, wherein the surfaces of said blades extend between said hub portion and the ring-shaped surface and the margins thereof are inwardly inclined in the direction away from said hub.

10. The invention defined in claim 9, wherein the radially outermost portions of the margins of said blades terminate inwardly of the inner surface area of said ring-shaped surface whereby said plurality of disc-shaped elements and said restraining means may be transported with said restraining means arranged in the form of a coil with the hubs of adjacent disc-shaped elements in axial abutment and the blades of adjacent elements axially offset to permit blades of adjacent elements on the inner side of said coil to be nested within the space defined by the respective adjacent ring-shaped surfaces.

11. The invention defined in claim 10, wherein said float means comprises a hollow generally toroidally-shaped body including means to attach said body to the restraining means in axially slidable concentric relation thereto, the outer diameter of said body being less than the inside diameter of the ring-shaped surfaces, the adjacent blades of said certain pairs of disc-shaped elements being inwardly recessed to accommodate said body.

12. Wave suppressing means for a parallel pair of adjacent swimming racing lanes defined by a taut cable extending lengthwise beween said adjacent lanes substantially at the water level, comprising a series of generally plate-shaped elements, means coacting with said taut cable to maintain each of said plate-shaped elements in alignment and individually revoluble about said cable at predetermined minimum spaced distances from each other along the length of said cable and substantially transversely disposed with respect to the taut cable to impede the movement of waves in diagonal lengthwise directions from one of said pair of lanes to the other of the pair of lanes.

13. The invention defined in claim 12, wherein said means coacting with said taut cable includes spacer means positioned centrally of each of said plate-shaped elements, said spacer means being provided with a passage transverse to the plane of the plate-shaped element and through which said taut cable is loosely received.

14. The invention defined in claim 13, wherein said spacer means projects outwardly on both sides of the plate-shaped element for abutting engagement with the spacer means of an adjacent plate-shaped element.

15. The invention defined in claim 13, wherein said plate-shaped elements include a generally circular sheet of material having a multiplicity of openings therein.

16. The invention defined in claim 13, wherein said plate-shaped elements include a plurality of axially projecting vanes to impede the movement of waves in directions generally transverse to the length of said pair of lanes.

17. The invention defined in claim 16, wherein said vanes are positioned to revolve said plate-shaped elements in response to wave movements, and said plate-shaped elements also include an arcuate surface projecting in an axial direction to impede transverse wave movement.

* * * * *